(No Model.) 2 Sheets—Sheet 1.
C. J. YARNOLD & W. J. ENGLEDUE.
APPARATUS FOR PURIFYING BARRELS.
No. 594,056. Patented Nov. 23, 1897.
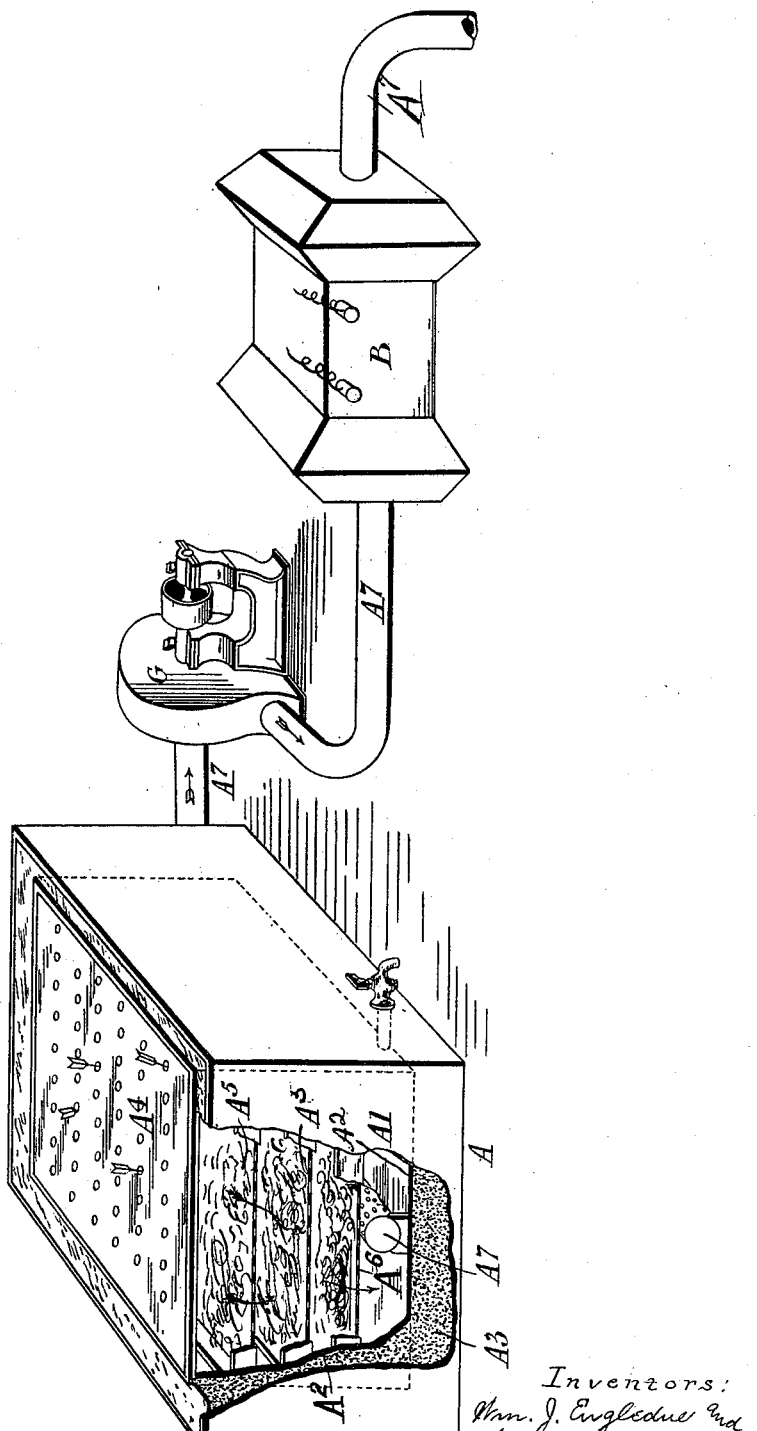

(No Model.) 2 Sheets—Sheet 2.
C. J. YARNOLD & W. J. ENGLEDUE.
APPARATUS FOR PURIFYING BARRELS.
No. 594,056. Patented Nov. 23, 1897.
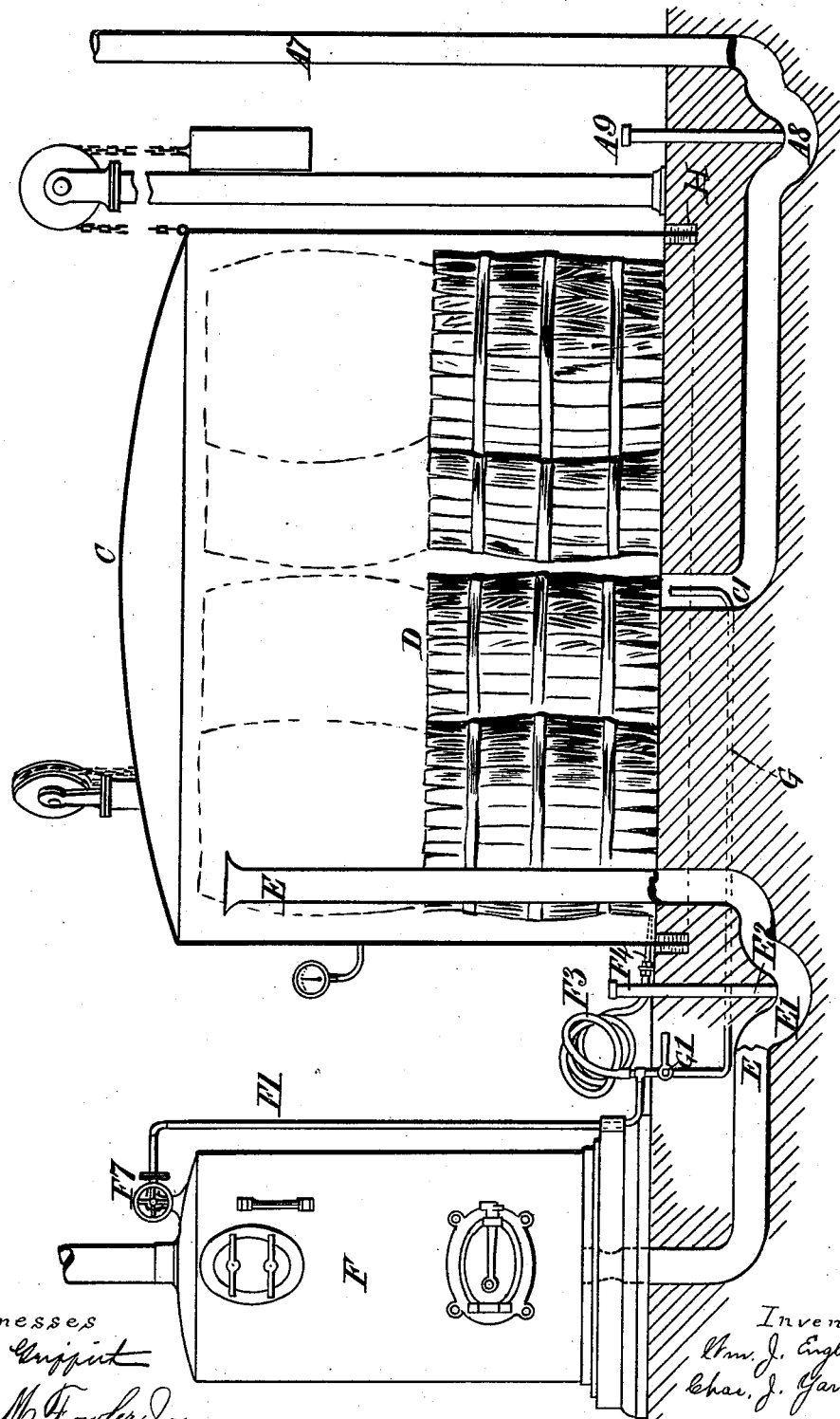

UNITED STATES PATENT OFFICE.

CHARLES JOHN YARNOLD, OF LONDON, AND WILLIAM JOHN ENGLEDUE, OF BYFLEET, ENGLAND.

APPARATUS FOR PURIFYING BARRELS.

SPECIFICATION forming part of Letters Patent No. 594,056, dated November 23, 1897.

Application filed December 28, 1896. Serial No. 617,279. (No model.)

*To all whom it may concern:*

Be it known that we, CHARLES JOHN YARNOLD, residing at Brixton, London, and WILLIAM JOHN ENGLEDUE, residing at Byfleet, in the county of Surrey, England, subjects of the Queen of England, have invented certain new and useful Improvements in or Relating to the Purification or Sweetening of Barrels, Casks, and the Like, of which the following is a specification.

This invention relates to the purification or sweetening of barrels, casks, and the like, particularly after they have been emptied of beer, wine, spirits, or other malt or alcoholic liquors, which are found to leave behind them an exceedingly unpleasant smell and in some cases a fungus or microscopic growth.

The object of this invention is to purify or sweeten such empty barrels, casks, and the like as often as may be necessary.

In carrying this invention into effect the interior of the barrels or casks may be first soaked in water or treated by, say, exhaust-steam, and then subjected to the action of ozone prepared in any convenient manner and delivered or injected into the barrel or cask by flexible tubes leading from the source of supply or caused otherwise to pass into intimate contact with the interior surfaces of the cask or barrel. The casks or barrels may be subjected to a final washing action.

The accompanying drawing illustrates diagrammatically one construction of apparatus for carrying out the object of this invention.

A is a filtering and drying chamber for atmospheric air, which is caused to pass therethrough by a fan which draws the cleaned dry air from it and propels it through the ozonizer B, wherein it is ozonized, to the interior of a chamber C, in which the barrels D are placed for treatment, preferably with their ends removed and with the outer bands taken off, so that the staves may open out a little from each other, as shown, in order that the ozone may be able to act easily upon parts of the staves which might otherwise escape its action.

E is an exhaust-pipe leading from the upper part of the chamber C to the ash-pit of a boiler F, which supplies steam for use in other parts of the process, as hereinafter described. By thus delivering into the ash-pit of a furnace the exhaust-ozone and such vapors as may pass over with it the combustion in the furnace is greatly improved, and all objectionable odor which might arise if the exhaust discharged freely into the atmosphere is destroyed.

In the example chosen for illustration the filtering and drying chamber A (shown partly in section) has double walls $A'$ $A^2$, the space between them being packed, as at $A^3$, with sawdust, and it is covered with a perforated lid $A^4$. In the space below the lid are trays $A^5$ $A^6$, perforated or otherwise arranged so that air can pass through them, the trays $A^5$ being charged with unslaked lime and the tray $A^6$ packed with cotton-wool. In the space below the tray $A^6$ is a perforated pipe $A^7$, communicating with the blower G, the perforations existing only within the chamber A. The blower G draws air through the perforations of the lid $A^4$ and the filtering and drying material in the trays through the perforations of the pipe $A^7$ and forces the air through the ozonizer B into the chamber C and thence into the ash-pit of the boiler F. If found necessary, the ozonized air may be cooled before being delivered to the chamber C.

It may be desirable to retain ozone in the chamber C for a considerable period after the latter has been filled therewith to act on its contents. This may be accomplished in any desired or preferred manner—as, for example, by providing the inlet-pipe $A^7$ with a bend or a dip $A^8$, and the exhaust-pipe E with a similar bend or dip $E'$, which may be filled with liquid to constitute a seal which will prevent the passage of ozone out of or into the chamber C.

$A^9$ and $E^2$ are stoppered tubes leading into the bends in order to permit the nozzle of the pump to be inserted for removal of the liquid seal when desired.

G is a pipe under the control of the valve $G'$, leading from the boiler to the interior of the chamber C, so that if necessary a jet of steam may be delivered thereinto for the purpose of keeping the barrels moist during treatment.

Each ozonizer is of the type in which the air is subjected to the action of a silent electrical discharge in narrow passages between sheets of dielectric material, containing or supporting metallic layers connected in a manner well understood to the source of electric energy.

The chamber C, which is constructed of or lined with a non-oxidizable material, is arranged so that it can be raised or lowered like the upper section of a gas-holder. In the floor below it is a trough H for a liquid seal into which the lower edge of the chamber dips when it is down, as shown in the drawings.

C' is the inlet in the floor of the chamber by which the ozone from the ozonizer enters.

F' is a steam-supply pipe controlled by a valve $F^7$, and provided with a flexible connection $F^3$ and nozzle $F^4$ for the delivery of steam to the barrels in the preliminary and final steaming operations hereinbefore referred to.

Having now particularly described and ascertained the nature of the said invention and in what manner the same is to be performed, we declare that what we claim is—

1. The process of purifying or sweetening barrels or casks which have contained alcoholic or malt liquors characterized by first damping the interior of the cask and then subjecting it to the action of ozone and finally subjecting it to a washing action.

2. In the purification or sweetening of barrels by ozone the combination with an air-drying and cleansing chamber A of a blower G ozonizer B and chamber C for the purpose set forth.

3. In the purification or sweetening of barrels by ozone the combination with an air-drying and cleansing chamber A of a blower G ozonizer B chamber C, and a boiler, for the purpose set forth.

4. The process of purifying or sweetening barrels or casks, consisting in first treating the interior of the casks with steam, then subjecting them to the action of ozone delivered into the barrels, and then cleansing the barrels by steam.

In testimony whereof we have hereto set our hands in the presence of the two subscribing witnesses.

CHARLES JOHN YARNOLD.
  WILLIAM JOHN ENGLEDUE.

Witnesses:
  HAROLD WADE,
  HARRY B. BRIDGE.